United States Patent [19]

Young et al.

[11] 4,075,941
[45] Feb. 28, 1978

[54] LINKAGE FOR CONTROLLING A NEEDLE SAFETY LATCH ON A BALER

[75] Inventors: Robert G. Young, Bird-in-Hand; Richard A. Pucher, Leola, both of Pa.

[73] Assignee: Sperry Rand Corporation, New Holland, Pa.

[21] Appl. No.: 718,644

[22] Filed: Aug. 30, 1976

[51] Int. Cl.² .............................................. B65B 13/08
[52] U.S. Cl. .................................................. 100/19 R
[58] Field of Search ........................... 100/4, 19 R, 53

[56] References Cited

U.S. PATENT DOCUMENTS

| | | | |
|---|---|---|---|
| 1,671,966 | 6/1928 | Burkholder | 100/19 R |
| 2,622,507 | 12/1952 | Hitchcock | 100/19 R |
| 2,651,252 | 9/1953 | Pope | 100/4 |
| 2,868,114 | 1/1959 | Hollyday | 100/19 R |
| 2,882,813 | 4/1959 | Nelson et al. | 100/19 R |
| 2,957,407 | 10/1960 | Vutz et al. | 100/19 R |
| 3,027,825 | 4/1962 | Nolt et al. | 100/19 R |
| 3,334,577 | 8/1967 | Majkrzak | 100/19 R |

*Primary Examiner*—Billy J. Wilhite
*Attorney, Agent, or Firm*—John B. Mitchell; John R. Flanagan; Frank A. Seemar

[57] ABSTRACT

A baler has improved linkage for controlling a needle safety latch mechanism being supported on the baler and biased for movement from a retracted position to an extended position for stopping the reciprocation of a plunger within a bale case on the baler if the timing between the plunger and a needle-carrying member on the baler is disrupted and the plunger moves on a working stroke when the needles are projected across the bale case and the path of the plunger. The improved linkage includes an elongated rigid member extending along the bale case and pivotally interconnected at one end to the latch mechanism and a link pivotally coupled adjacent one of its ends to pivot means which also pivotally mounts the needle-carrying member. The link adjacent an opposite one of its ends is pivotally coupled to an opposite end of the elongated member. Also, the link includes a portion disposed in the path of movement of the needle-carrying member. The latter member engages a resilient, rubber-like element on the link to hold the link at a first position when the needle-carrying member is at its home position and thereby, via the elongated rigid member, holds the latch mechanism at its retracted position. As the needle-carrying member moves away from its home position toward the bale case to project the needles across the bale case, it allows the link to pivot to a second position as the bias of the latch mechanism moves it to its extended position upon the release of the link.

4 Claims, 7 Drawing Figures

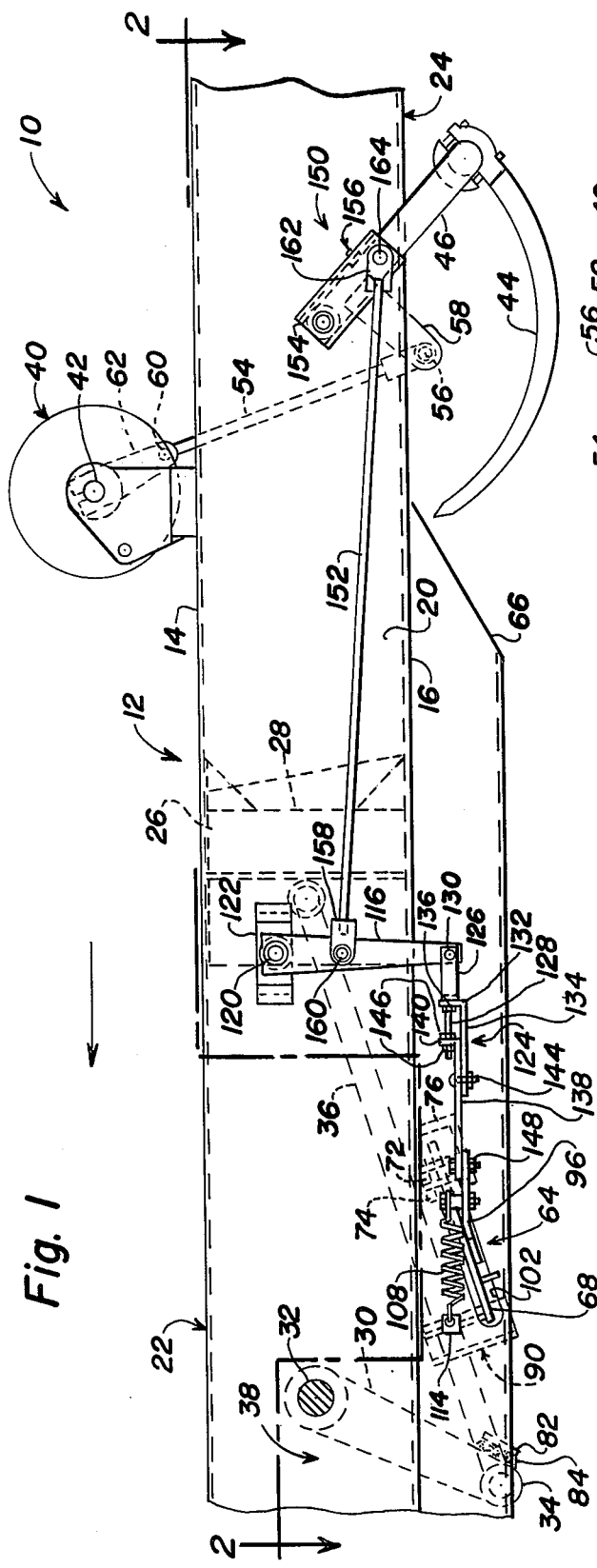
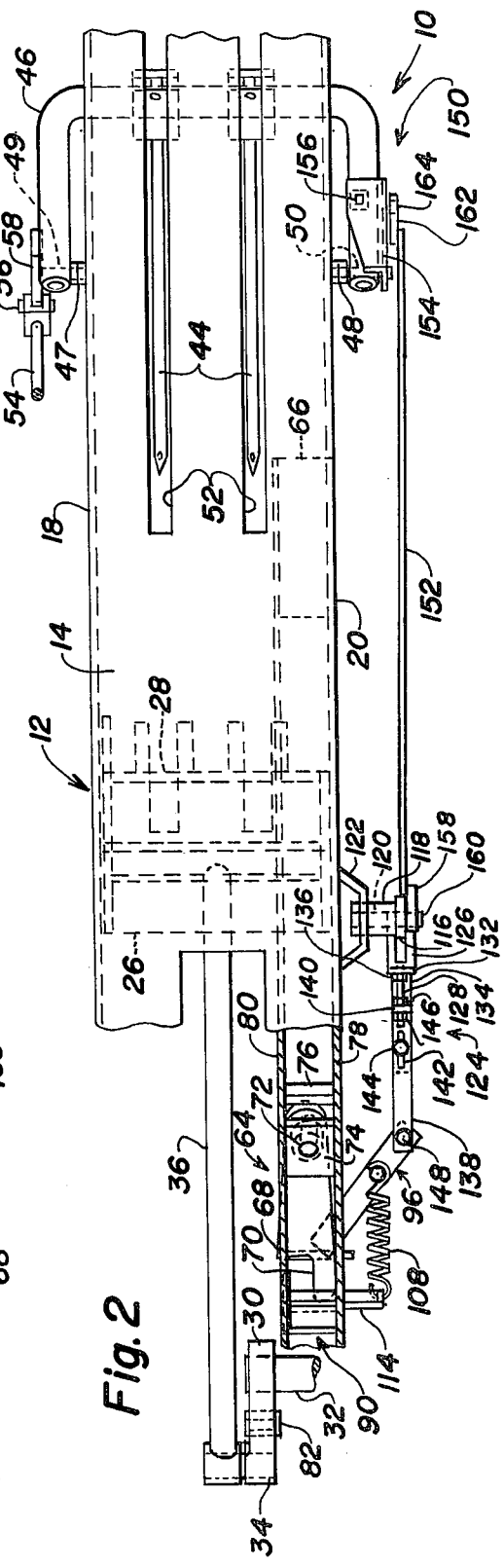
Fig. 1
Fig. 2

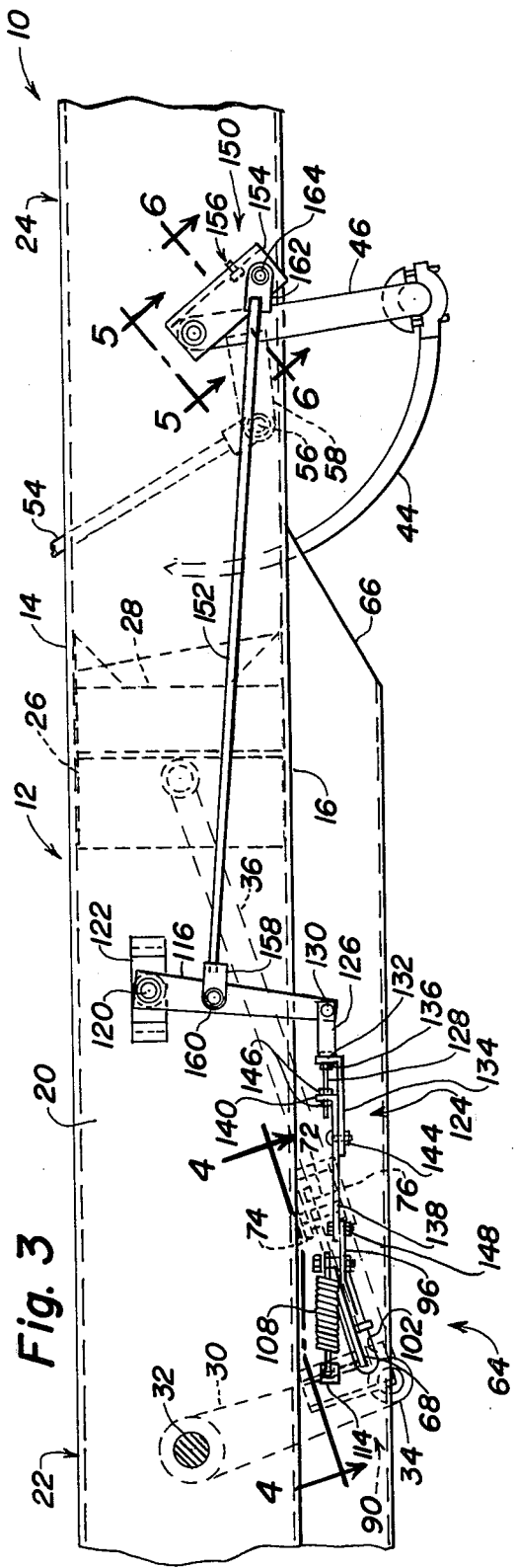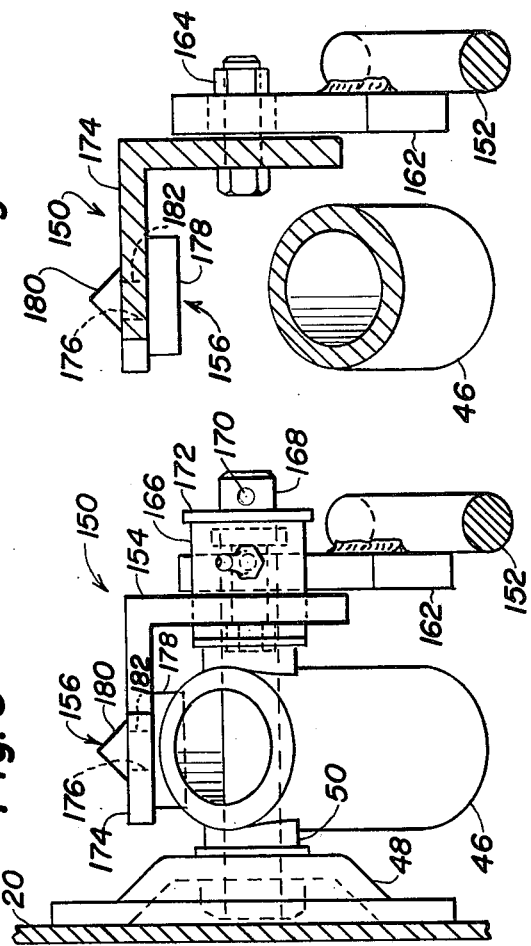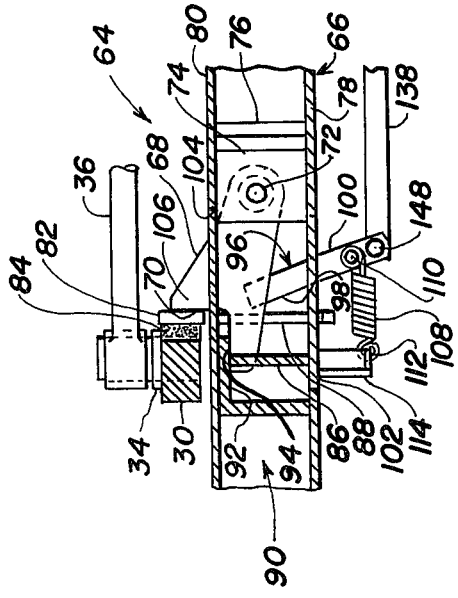

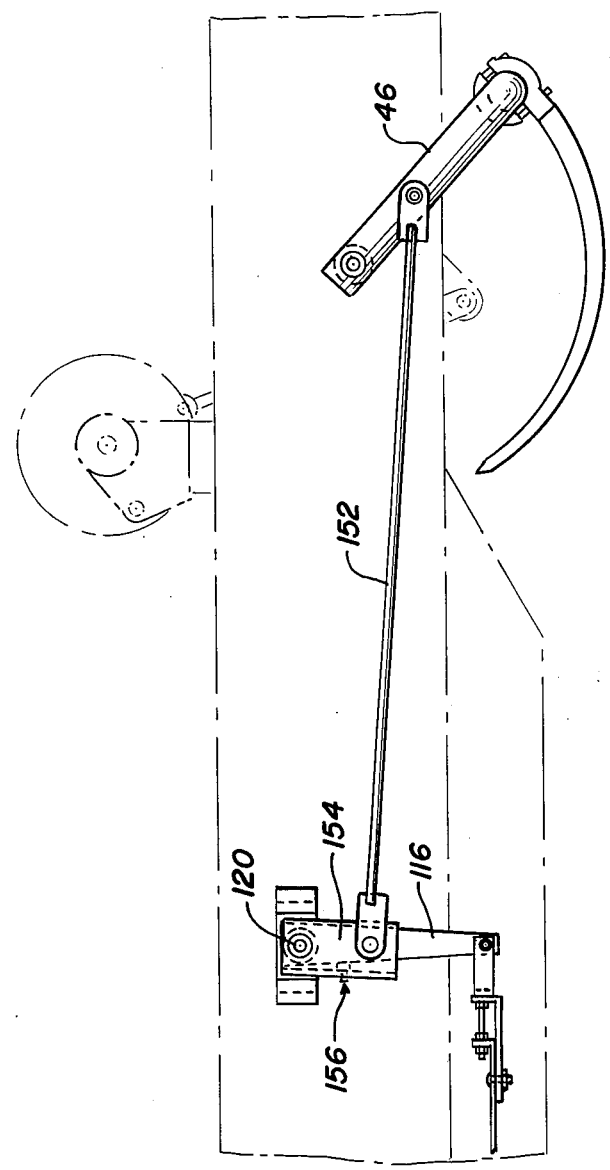

LINKAGE FOR CONTROLLING A NEEDLE SAFETY LATCH ON A BALER

BACKGROUND OF THE INVENTION

1. Field of the Invention

The present invention relates generally to a baler and, more particularly, is concerned with an improved linkage for controlling a needle safety latch on the baler.

2. Description of the Prior Art

A conventional baler has a fore-and-aft extending bale case within which a plunger is reciprocably driven by a rotating crank arm through working and return strokes for forming a bale of crop material in the bale case. Crop material is fed into the bale case in successive charges and each charge is compressed by the plunger on its working stroke.

A plurality of charges produce a bale of crop material and when the bale is completed it is banded by a tying medium, such as by strands of twine or wire. The tying medium is extended around the completed bale by movable needles which are projectable across the bale case. Specifically, the needles are moved across the bale case, a tying operation is completed and then the needles are retracted from the bale case, all occurring between the last working stroke of the plunger which completed the bale and the next successive working stroke of the plunger for starting the next bale. Since the needles are moved across the path of travel of the plunger and the charge of crop material being compressed by the plunger, precise synchronization or timing is required between the continuous reciprocation of the plunger and the movement of the needles.

It sometimes happens that the drive mechanism for moving the needles breaks at a time when the needles are projected across the bale case. Instead of being retracted, they are left in the bale case and in the path of the plunger on its next working stroke and thus in the path of the next charge of crop material being carried and compressed by the plunger.

To prevent damage to the needles which would otherwise result under such circumstances, it is common practice to provide a safety latch to stop the plunger on its next working stroke. Conventionally, such latch is mounted on the bale case and extendible into the reciprocatory path of the plunger or the rotational path of the rotating crank arm which drives the plunger. The latch is moved to its extended position each time the needles are moved through the bale case and to a retracted position when the needles are withdrawn from the bale case. Thus, if the needles are in the bale case when the plunger moves on a working stroke, the plunger or the crank arm, depending upon the particular arrangement being provided, will engage the safety latch, causing the plunger to stop. To prevent the drive mechanism to which the crank arm is attached from being damaged, one or more shear bolts are provided which break when the latch stops the movement of the plunger.

However, during those periods of normal operation of the baler when the drive mechanism for the needles is functioning properly to move the needles into and out of the bale case in precise synchronization with the reciprocating strokes of the plunger, it is essential that the needle safety latch be completely withdrawn to its retracted position after each extension thereof each time the needles have been fully retracted from the bale case in order that the reciprocation of the plunger on its next working stroke will not be inadvertently disrupted.

Heretofore, the safety latch has commonly been spring-biased to move toward its extended position, with several types of linkages being found in the prior art for allowing the latch to move to its extended position when the needles are projected through the bale case and for retracting the latch when the needles are withdrawn from the bale case.

One type of prior art linkage, being disclosed in U.S. Pat. Nos. 2,868,114, 2,882,813 and 3,027,825, interconnects the mechanism being associated with the safety latch and a lever being pivotally mounted on the bale case adjacent a swingable yoke which mounts the needles. As the yoke reaches its home or rest position in retracting the needles from the bale case, it strikes and pivots the lever which causes retraction of the safety latch.

In a second type of prior art linkage, as disclosed in U.S. Pat. No. 2,957,407, a fore-and-aft extending link arm is disposed adjacent the needle yoke and connected with the mechanism of the safety latch. Again, as the yoke returns to its home position in retracting the needles, a roller carried by the yoke strikes an abutment on the link arm and causes the link arm to move so as to retract the latch.

A third type of prior art linkage provides a flexible cable which interconnects the needle yoke and a pivotal crank mounted on the bale case and connected to the mechanism of the safety latch. As the yoke is moved so as to project the needles through the bale case, the cable slackens allowing the latch to move to its extended position. However, as the yoke returns to its home position in retracting the needles from the bale case, the cable is suddenly drawn taut and pivots the crank arm so as to cause retraction of the safety latch.

While all of the above-described prior art linkages would appear to be satisfactory if properly adjusted, they all are apt to need adjustment or repair after extended periods of normal use of the baler due to the sudden shock or impact loads imparted on the parts thereof when engaged or moved by the moving needle yoke. Such loads frequently result in wear and material fatigue or failure of the parts. Also, in the case of those linkages incorporating flexible cables, the rapid movement of the yoke to its home position causes a whipping of the cable as the slack therein is suddenly taken up. Such whipping action after a period of use stretches the cable and, consequently, the safety latch will not then be fully retracted unless the length of the cable is adjusted to shorten it.

SUMMARY OF THE INVENTION

The present invention provides an improved linkage for controlling the needle safety latch mechanism which greatly reduces the problems heretofore experienced with the prior art linkages.

Particularly, a link is pivotally coupled on the pivot means which also pivotally mounts one end portion of the needle-carrying yoke. Also, an elongated rigid member is pivotally connected at one end to the link and at an opposite end is pivotally interconnected to the latch mechanism. The link includes a portion which is disposed in the path of movement of the yoke such that when the yoke is disposed at its home position with the needles withdrawn from the bale case, it holds the link at a first position and thereby via the elongated member, holds the latch mechanism at a retracted position. Then, as the yoke moves toward the bale case to project the needles across the bale case, it releases the link and allows the link to pivot to a second position as the bias of the latch mechanism moves the same to its extended position upon the release of the link.

Further, an element formed from resilient, rubber-like material is disposed on the portion of the link and engages the yoke when the same approaches its home position, whereby the sudden impact load of the yoke against the link will be absorbed by the resilient element as the link is moved back to its first position by the yoke.

Other advantages and attainments of the improvement provided by the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which:

FIG. 1 is a fragmentary generally diagrammatic side elevational view of the bale case portion of a hay baler having mounted thereon the needle safety latch mechanism and an improved linkage of the present invention for controlling the latch, with the plunger of the baler being shown during a working stroke and the needles of the baler retracted;

FIG. 2 is a plan view taken along lines 2—2 of FIG. 1 looking in the direction of the arrows;

FIG. 3 is a side elevational view similar to that of FIG. 1, but showing the needles partially projected across the bale case and the safety latch operating to stop the plunger on a working stroke;

FIG. 4 is an enlarged fragmentary plan view taken along lines 4—4 of FIG. 3, showing the safety latch and its associated mechanism as illustrated in FIG. 3;

FIG. 5 is an enlarged fragmentary view taken along line 5—5 of FIG. 3, showing the cushioned pivotal link of the improved linkage of the present invention being pivotally mounted on the needle yoke pivot element;

FIG. 6 is an enlarged fragmentary sectional view taken along line 6—6 of FIG. 3; and FIG. 7 is a fragmentary generally diagrammatic side elevational view of the bale case portion of a hay baler, similar to FIG. 1, but showing another embodiment of the safety latch mechanism.

DETAILED DESCRIPTION OF THE INVENTION

In the following description, right hand and left hand references are determined by facing in the direction of the arrow of FIG. 1, which is the same as the forward direction of travel of the baler across the field. Also, in the following description, it is to be understood that such terms as "forward," "rearward," "left," "upwardly," etc., are words of convenience and are not to be construed as limiting terms.

In General

Referring now to the drawings, and particularly to FIGS. 1 and 2, there is partly shown a hay baler, being indicated generally by numeral 10 and incorporating the preferred embodiment of the improvement provided by the present invention.

The baler 10 has at its left side a bale case, generally designated 12, which extends longitudinally fore-and-aft. The bale case 12 is formed by a top wall 14, a bottom wall 16 and opposite side walls 18,20. The bale case 12 is generally rectangular in cross section and has a forward end portion 22 and a rear end portion 24.

The baler 10 further includes a feeder housing (not shown) which extends laterally from the right inboard side wall 18 of the bale case 12 and has a feeding mechanism (not shown) operably disposed therein for successively feeding charges of crop material into the bale case 12 through an inlet opening (not shown) formed in its inboard side wall 18. A pickup assembly (not shown) is mounted on the baler 10 forwardly and below the feeder housing and adapted to lift crop material from the field and deliver it to the feeding mechanism.

A plunger 26 is mounted for reciprocable movement within the bale case 12 for forming the charges of crop material fed therein through the inlet opening into rectangular bales. Specifically, the crop material charges are fed and deposited by the feeding mechanism into the bale case ahead of the working face 28 of the plunger 26. During each operating cycle, the plunger 26 moves from a position forwardly of the bale case inlet opening and adjacent the forward end portion 22 of the bale case 12 toward the rear end portion 24 of the bale case 12 and then returns to its forward position. The plunger 26 is moved rearwardly on a working stroke and then retracted forwardly on a return stroke by a crank arm 30 mounted on a rotating drive shaft 32 projecting from a gear box (not shown) mounted at the forward end portion 22 of the bale case 12. The gear box drive components (not shown) receive rotary power from the baler flywheel (not shown) which, in turn, is drivingly interconnected to a power takeoff shaft (not shown) of the tractor which tows the baler. The crank arm 30 extends radially from the drive shaft 32 and has an outer end 34 to which one end of a connecting rod 36 is pivotally connected. The opposite end of the connecting rod 36 is pivotally connected to the plunger 26. The crank arm 30 rotates as indicated by the arrow 38 in FIG. 1.

As the successive charges of crop material are compressed by the plunger 26 into a bale, the bale is progressively moved toward the rear end portion 24 of the bale case 12. As each bale is completed, it is banded with a suitable tying medium and tied by a tying mechanism, generally designated 40, being mounted on the bale case 12 generally intermediately between the forward and rear end portions 22,24 thereof. Once completed and tied, each bale soon emerges from the rear end portion 24 of the bale case 12 at a discharge end (not shown) thereof.

The tying mechanism 40 includes a timer shaft 42 which rotates one revolution during each tying cycle. The tying medium is projected around the completed bale by needles 44, there being one needle for each strand of the banding or tying medium. In the present embodiment, two needles are shown. The needles 44 are carried on a yoke 46 which straddles the bale case 12 and is pivotally connected to bracket plates 47,48 on the bale case side walls 18,20 by suitable pivot elements 49,50 (FIG. 2). The top and bottom walls 14,16 of the bale case 12 have spaced longitudinal slots 52 (only the top slots being seen in FIG. 2) through which the needles 44 are adapted to pass when the latter are projected and retracted through the bale case 12. The needle yoke 46 is adapted to be pivoted by a rod 54 pivotally connected at its lower end at 56 to an arm 58 extending forwardly from the yoke 46. The upper end of the rod 54 is pivotally connected at 60 to a crank arm 62 connected to the timer shaft 42. When the timer shaft 42 rotates one revolution, the crank arm 62 rotates with it causing the rod 54 to be pulled upwardly from its normal at-rest position (FIG. 1) and then pushed downwardly. This causes the yoke 46 to pivot about the pivot elements 48,50 and first project the needles 44 across the bale case 12 and then return them to the at-rest or home position shown in FIG. 1. In FIG. 3, the needles 44 are shown partially projected across the bale case 12.

Needle Safety Latch Mechanism

The reciprocation of the plunger 26 and the rotation of the timer shaft 42 are precisely timed or synchronized so that the needles 44 are projected across the bale case 12 and then retracted between successive working strokes of the plunger 26. However, the drive mechanism for the needles 44 might break and leave the needles 44 projected across the bale case 12. In such case the crop material being carried and compressed by the plunger 26 on its next working stroke would strike and damage the needles 44. To protect against this, a conventional needle safety latch mechanism, generally designated by the numeral 64, is provided.

Referring now to FIGS. 1 through 4, the needle safety latch mechanism 64 is shown mounted on a fore-and-aft extending support channel 66 being fixed along the bottom wall 16 of the bale case 12 adjacent the outboard side wall 20 thereof. The mechanism 64 includes a latch 68 having an inwardly-opening notch 70 formed in one end thereof and being pivotally mounted at an opposite end thereof at 72 between an upper mounting plate 74 and a lower angle mounting bracket 76, the plate and bracket both extending between and fixed to the sides 78,80 of the support channel 66.

The latch 68 is pivotally movable between an outer retracted position, as seen in FIG. 2, and an inner extended position, as seen in FIG. 4. The latch 68 is disposed in a forward and downward inclined angular relationship such that it will be generally perpendicular relative to the crank arm 30 and approximately tangential to and within the rotational path of a flat plate 82 being secured and carried on the outer end 34 of the crank arm 30 by a resilient pad 84 of rubber-like material which cushions somewhat the engagement of the plate 82 within the notch 70 of the latch 68, as seen in FIG. 4, when the latch is disposed at its inner, extended position during a working stroke of the plunger 26. The one end of the latch 68 having the notch 70 formed therein is confined between upper and lower guide plates 86,88 which extend between the sides 78,80 of the support channel 66. An angled brace 90 is disposed across the channel 66 forwardly of the latch 68 and has a rearwardly-extending side portion 92 to which is attached the inner end of the upper guide plate 86 and against which an inwardly-facing surface 94 on the notched-end of the latch 68 abuts when the latch 68 is moved to its extended position, as seen in FIG. 4. Thus, the side portion 92 of the brace 90 limits the inward projection of the latch 86 so as to align its notch 70 within the path of the flat plate 82 carried on the crank arm outer end 34.

The safety mechanism 64 further includes a lever 96 being fixed at one end of a downwardly bent portion 98 thereof to the outer edge portion of the latch 68. The bent lever portion 98 extends outwardly and rearwardly and merges into a horizontal portion 100 of the lever 96. Aligned elongated slots 102,104, which extend in the same forward and downward inclined angular relationship as the latch 68, are respectively formed through the outer and inner sides 70,80 of the support channel 66 adjacent the latch 68. The bent portion 98 of the lever 96 will move through the outer slot 102 as an inwardly projecting portion 106 of the latch 68 moves through the inner slot 104 concurrently with movement of the latch 68 between its retracted and extended positions.

The safety mechanism 64 also includes a spring 108 being attached at its rear end at 110 to the horizontal portion 100 of the lever 96 and at its forward end at 112 to the outer end of a brace 114 which is fixed at its inner end to the outer side 78 of the support channel 66. The spring 108 in its normal contracted condition, as seen in FIG. 4, biases the latch 68 to its extended position. When the latch 68 is moved against the bias of the spring 108 to its retracted position, the spring 108 yields to an extended position, as seen in FIG. 2.

Improved Linkage for Controlling the Needle Safety Latch

As has been heretofore conventionally provided, a lever arm 116 is disposed on the outboard side wall 20 of the bale case 12 at a position therealong between the respective loctions of the needle yoke 46 and the needle safety latch mechanism 64. The lever arm 116 at its upper end has a hub 118 rotatably mounted on a pivot element 120 secured to and projecting outwardly from a brace 122 secured on the outboard side wall 20 of the bale case 12. The lever arm 116 extends generally downward and its lower end is pivotally interconnected to the outer end of the horizontal portion 100 of the lever 96 of the safety latch mechanism 64 by a conventional adjustable link assembly, generally designated as 124.

The adjustable link assembly 124 includes a clevis 126 which is connected to one end of a threaded stem 128 and is pivotally connected at 130 to the lower end of the lever arm 116. An upturned end 132 of a first link 134 is received on the stem 128 and a nut 136 is threaded thereon to secure the end 132 against the clevis 126. A second link 138 has an upturned end 140 which is received on the outer end portion of the stem 128. The second link 138 is disposed on the first link 134 and has an elongated slot 142 formed therein which is aligned above an opening in the first link 134. A bolt 144 extends through the slot 142 in the second link 138 and the opening in the first link 134 and is tightened down to secure the two links together. Also, a pair of nuts 146 are threaded on the stem 128 at either side of the upturned end 140 of the second link 138 to secure the link end to the stem. The position of the second link 138 along the first link 134 may be adjusted by loosening the bolt 144 and the nuts 146, then sliding the second link relative to the first link and then re-tightening the bolt 144 and nuts 146. The forward end of the second link 138 is pivotally connected at 148 to the outer end of the horizontal portion 100 of the lever 96.

As viewed in FIGS. 1, 2, 3, 5 and 6, the improved linkage provided by the present invention, being generally designated 150, interconnects the lever arm 116 with the needle yoke 46 and basically includes a rigid connecting rod 152, a pivotal link 154 and a cushion bumper 156 mounted on the link 154. The connecting rod 152 has a plate 158 attached to the forward end thereof which is pivotally secured at 160 to an intermediate portion of the lever arm 116 and has another plate 162 attached to a rear end of the rod 152 which is pivotally secured at 164 to the lower end of the pivotal link 154. The pivotal link 154 has a hub 166 secured at the upper end thereof which rotatably receives the outer end portion 168 of the left pivot element 50 which rotatably mounts the left end of the needle yoke 46. A cotter key 170 inserted through the outer end portion 168 retains the link 154 thereon adjacent the left end portion of the yoke 46. A washer 172 is inserted on the portion 168 between the cotter key 170 and the outer side of the hub 166. The pivotal link 154 has a rear inturned flange 174 which overlies the rear side of the left end portion of the needle yoke 46 and has an opening 176 formed therein at a location spaced upwardly from its lower end. The cushion bumper 156 is received through the opening 176 in the flange 174. The bumper 156 is formed from suitable resilient rubber-like material and includes a rectangular head portion 178, a conical tail portion 180 and cylindrical body portion 182 interconnecting the head and tail portions. The material of the bumper 156 will deform sufficiently to allow the tail portion 180 thereof to be inserted through the opening 176 for mounting the bumper 156 on the flange 174 of the pivotal link 154. Once the tail portion 180 is inserted through the opening, it returns to its original conical shape which retains the bumper 156 in its position shown in FIGS. 5 and 6 wherein the head portion 178 is disposed on the side of the pivotal link flange 174 which faces the yoke 46.

Operation

As seen in FIGS. 1 and 2, the needle yoke 46 is disposed at its home position wherein the needles carried by the yoke 46 are located outside the bale case 12. In such position, the upper left end portion of the yoke 46 is engaged with the bumper 156 on the pivotal link 154 and holds the link 154 in a first position which via the rigid connecting rod 152 and the lever arm 116 retains the latch 68 in its retracted position out of the rotational path of the crank arm 30. As the needle yoke 46 is moved away from its home position toward the bale case 12 in projecting the needles 44 across the bale case 12 and through slots 52 therein, it moves away from the pivotal link 154 and releases its hold on the same. However, since the latch 68 is biased by spring 108 to move toward its extended position of FIG. 4 and due to the fact that the biasing force of the spring 108 is transmitted through the lever arm 116 and the connecting rod 152 as a forward pulling force on the pivotal link 154, as the yoke 46 begins its movement toward the bale case 12 the pivotal link 154 concurrently pivots forwardly with it to a second position, as seen in FIG. 3. The link 154 only has to pivot through a slight angular displacement in moving between its first and second positions in order for the latch 68 to move from its retracted to extended position.

If a component of the drive mechanism for the needles 44, such as the rod 54, should break while the needles are projected across the bale case 12, the yoke 46 will obviously not be moved back to its home position and, thus, the latch 68 will remain across the path of the rotating crank arm 30. Therefore, on the next working stroke of the plunger 26, the plate 82 on the crank arm 30 will strike the latch 68 within the notch 70 formed thereon and thereby the reciprocation of the plunger 26 will be stopped. One or more shear bolts (not shown) provided in the driveline to the crank arm 30 will break when the plunger stops and thereby prevent damage to the mechanism which drives the crank arm. Since the plunger will be stopped, it will not move the next charge of hay into engagement with the needles which project across the bale case, as seen in FIG. 3.

However, as is most often the case, the drive mechanism for the needles function properly to move the yoke 46 back toward its home position and withdraw the needles from the bale case 12 before the plunger 26 starts on its next working stroke. As the yoke 46 approaches close to its home position, it engages the bumper 156 on the pivotal link 154. The link 154 then pivots with the yoke 46 and moves from its second position of FIG. 3 to its first position of FIG. 1 as the yoke reaches its home position. Such movement of the link 154 concurrently pulls the connecting rod 152 rearwardly and simultaneously pivots the lever arm 116 from its forward position of FIG. 3 to its rear position of FIG. 1. The lever arm 116 through the adjustable link assembly 124 causes the latch to pivot against the biasing force of the spring 108 from its extended position back to its retracted position, as respectively seen in FIGS. 3 and 1.

The bumper 156 on the pivotal link 154 in being formed from resilient rubber-like material absorbs the sudden impact load of the yoke 46 against the link 154 as the yoke 46 engages the bumper 156 and moves the link 154 back to its first position as the yoke 46 reaches its home position.

While the pivotal link 154 is shown mounted on the left pivot element 50 of the needle yoke 46 with the forward end of the connecting rod 152 pivotally coupled to the lever arm 116, this arrangement could be reversed, as shown in FIG. 7, such that the link 154 would be pivotally coupled to the pivot element 120 of the lever arm 116 with the rear end of the connecting rod 152 pivotally coupled to the left portion of the needle yoke 46. In such arrangement, the inturned flange 174 of the link 154 would be disposed forwardly of and within the path of pivotal movement of the lever arm 116.

It is thought that the improved linkage of the present invention and many of its attendant advantages will be understood from the foregoing description and it will be apparent that various changes may be made in the form, construction and arrangement of its parts without departing from the spirit and scope of the invention or sacrificing all of its material advantages, the form hereinbefore described being merely a preferred or exemplary embodiment thereof.

Having thus described the invention, what is claimed is:

1. In a baler having a bale case, a plunger reciprocable in said bale case on working and return strokes, one or more needles for carrying banding material across said bale case, first pivot means on said bale case, a needle-carrying member being coupled through said first pivot means for movement from a home position towards said bale case and then away from said bale case back to said home position so as to correspondingly project said needles from a location outside said bale case to across said bale case and then withdraw said needles from said bale case back to said outside location, means reciprocating said plunger in timed relation with the movement of said needle-carrying member such that said needles are first projected and then withdrawn from across said bale case between predetermined successive working strokes of said plunger, a safety latch mechanism supported on said baler, means biasing said latch mechanism for movement from a retracted position to an extended position for stopping the reciprocation of said plunger if the timing between said plunger and said needle-carrying member is disrupted and said plunger moves on a working stroke when said needles are projected across said bale case, second pivot means on said bale case, a lever arm coupled to said second pivot means for a pivotable movement about the same and being pivotally interconnected to said latch mechanism, an improved linkage for controlling said latch mechanism, comprising:

an elongated rigid member extending along said bale case and being pivotally interconnected at one end to said lever arm; and a link pivotally coupled adjacent one of its ends to said first pivot means for said needle-carrying member, said link being pivotally coupled adjacent an opposite one of its ends to an opposite end of said elongated member, said link including a portion disposed in the path of movement of said needle-carrying member such that said needle-carrying member holds said link at a first position when said needle-carrying member is at its home position which via said elongated member and said lever arm holds said latch mechanism at said retracted position, said needle-carrying member releasing said link from said first position upon movement of said needle-carrying member away from its home position toward said bale case to allow said link to pivot to a second position as said biasing means moves said latch mechanism to its extended position upon said release of said link.

2. In a baler as recited in claim 1, further comprising an element formed from resilient rubber-like material being disposed on said portion of said link and engaged with said needle-carrying member when the latter is at its home position.

3. In a baler having a bale case, a plunger reciprocable in said bale case on working and return strokes, one or more needles for carrying banding material across said bale case, first pivot means on said bale case, a needle-carrying member being coupled through said first pivot means for movement from a home position towards said bale case and then away from said bale case back to said home position so as to correspondingly project said needles from a location outside said bale case to across said bale case and then withdraw said needles from said bale case back to said outside location, means reciprocating said plunger in timed relation with the movement of said needle-carrying member such that said needles are first projected and then withdrawn from across said bale case between predetermined successive working strokes of said plunger, a safety latch mechanism supported on said baler, means biasing said latch mechanism for movement from a retracted position to an extended position for stopping the reciprocation of said plunger if the timing between said plunger and said needle-carrying member is disrupted and said plunger moves on a working stroke when said needles are projected across said bale case, second pivot means on said bale case, a lever arm coupled to said second pivot means for a pivotable movement about the same and being pivotally interconnected to said latch mechanism, an improved linkage for controlling said latch mechanism, comprising:

an elongated rigid member extending along said bale case and being pivotally interconnected at one end to said needle-carrying member; and a link pivotally coupled adjacent one of its ends to said second pivot means for said lever arm, said link being pivotally coupled adjacent an opposite one of its ends to an opposite end of said elongated member, said link including a portion disposed in the path of movement of said lever arm such that said lever arm holds said link at a first position when said needle-carrying member is at its home position which via said elongated member and said lever arm holds said latch mechanism at said retracted position, said lever arm releasing said link from said first position upon movement of said needle-carrying member away from its home position towards said bale case to allow said link to pivot to a second position as said biasing means moves said latch mechanism to its extended position upon said release of said link.

4. In a baler as recited in claim 3, further comprising an element formed from resilient rubber-like material being disposed on said portion of said link and engaged with said lever arm when said needle-carrying member is at its home position.

* * * * *